(12) United States Patent
Kim

(10) Patent No.: US 9,694,823 B2
(45) Date of Patent: Jul. 4, 2017

(54) METHOD AND APPARATUS OF CONTROLLING VEHICLE INCLUDING DRIVING MOTOR

(71) Applicant: Hyundai Motor Company, Seoul (KR)

(72) Inventor: Sang Joon Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/941,607

(22) Filed: Nov. 15, 2015

(65) Prior Publication Data

US 2017/0008529 A1 Jan. 12, 2017

(30) Foreign Application Priority Data

Jul. 7, 2015 (KR) .................. 10-2015-0096813

(51) Int. Cl.
*B60W 30/18* (2012.01)
*B60W 10/08* (2006.01)
(Continued)

(52) U.S. Cl.
CPC ....... *B60W 30/18127* (2013.01); *B60K 6/442* (2013.01); *B60K 6/547* (2013.01);
(Continued)

(58) Field of Classification Search
CPC ...... B60W 30/18127; B60W 30/18118; B60K 6/48; B60K 6/442; B60T 8/245;
(Continued)

(56) References Cited

U.S. PATENT DOCUMENTS

| 4,602,702 A * | 7/1986 | Ohta ...................... B60T 8/326 188/106 P |
| 2012/0302396 A1* | 11/2012 | Park ...................... B60K 6/442 477/5 |

(Continued)

FOREIGN PATENT DOCUMENTS

| JP | 11-027802 A | 1/1999 |
| JP | 05-292603 B2 | 9/2013 |
| KR | 10-0579287 B1 | 5/2006 |

OTHER PUBLICATIONS

V. Ngo et al., "Gear shift map design methodology for automotive transmissions," Journal of Automotive Engineering, Issue 23, Aug. 2013, pp. 1-23.

*Primary Examiner* — Yuri Kan
(74) *Attorney, Agent, or Firm* — Mintz Levin Cohn Ferris Glovsky and Popeo, P.C.; Peter F. Corless

(57) ABSTRACT

A control method and apparatus of a vehicle including a drive motor are provided. The control apparatus includes a data detector that detects data to operate the vehicle and a controller that determines whether a braking condition is satisfied based on the data. The controller calculates a total braking amount and a regenerative braking allowance when the braking condition is satisfied and determines whether a shifting condition is satisfied when the braking condition is satisfied. A first actuator receives a control signal from the controller to adjust a hydraulic pressure supplied to each frictional element of the transmission and a second actuator receives the control signal from the controller to adjust the hydraulic pressure supplied to the wheel cylinder. An inverter receives the control signal from the controller to determine a switching operation of a switching element.

20 Claims, 7 Drawing Sheets

(51) Int. Cl.
*B60K 6/442* (2007.10)
*B60K 6/547* (2007.10)
*B60W 10/02* (2006.01)
*B60W 10/06* (2006.01)
*B60W 10/11* (2012.01)
*B60W 10/184* (2012.01)
*B60W 30/19* (2012.01)
*B60W 20/30* (2016.01)
*B60W 20/14* (2016.01)

(52) U.S. Cl.
CPC ............ *B60W 10/02* (2013.01); *B60W 10/06* (2013.01); *B60W 10/08* (2013.01); *B60W 10/11* (2013.01); *B60W 10/184* (2013.01); *B60W 20/14* (2016.01); *B60W 20/30* (2013.01); *B60W 30/19* (2013.01); *B60W 2510/244* (2013.01); *B60W 2510/246* (2013.01); *B60W 2520/10* (2013.01); *B60W 2540/10* (2013.01); *B60W 2540/12* (2013.01); *B60W 2540/16* (2013.01); *B60W 2540/165* (2013.01); *B60W 2710/083* (2013.01); *B60W 2710/1005* (2013.01); *B60Y 2300/89* (2013.01)

(58) Field of Classification Search
CPC .......... B60T 1/10; B60T 8/4872; B60T 8/326; B60L 7/26; B60L 3/102
See application file for complete search history.

(56) References Cited

U.S. PATENT DOCUMENTS

| | | | |
|---|---|---|---|
| 2014/0062176 A1* | 3/2014 | Nishida | B60T 8/4872 303/3 |
| 2014/0203624 A1* | 7/2014 | Hilton | B60T 1/10 303/3 |
| 2014/0210216 A1* | 7/2014 | Konishi | B60K 6/48 290/38 R |
| 2016/0096434 A1* | 4/2016 | Nakaoka | B60L 3/102 701/78 |
| 2016/0159225 A1* | 6/2016 | Nakatsu | B60L 7/26 701/71 |
| 2016/0304068 A1* | 10/2016 | Monzaki | B60T 8/245 |
| 2016/0311437 A1* | 10/2016 | Tabuchi | B60W 30/18118 |

* cited by examiner

METHOD AND APPARATUS OF CONTROLLING VEHICLE INCLUDING DRIVING MOTOR

CROSS-REFERENCE TO RELATED APPLICATION

This application claims priority to and the benefit of Korean Patent Application No. 10-2015-0096813 filed in the Korean Intellectual Property Office on Jul. 7, 2015, the entire contents of which are incorporated herein by reference.

BACKGROUND (a) Field of the Invention

The present invention relates to a control method and apparatus of a vehicle including a drive motor, and more particularly, to a control method and apparatus of a vehicle including a drive motor in which braking control and shift control are improved by increasing the torque of the drive motor to a predetermined value when the shifting condition is satisfied during the driving by the braking or the inertia.

(b) Description of the Related Art

An environmentally-friendly technology of a vehicle is a core technology which controls survival of a future automobile industry, and advanced vehicle manufacturers have focused energy on the development of environmentally-friendly vehicles to satisfy environmental and fuel efficiency regulations. Therefore, vehicle manufacturers have developed an electric vehicle (EV), a hybrid electric vehicle (HEV), a fuel cell electric vehicle (FCEV), and the like, as future vehicle technologies.

The vehicle manufacturers have researched the hybrid electric vehicle as an alternative to solve problems such as satisfaction of exhaust gas regulations and enhancement of fuel efficiency performance, and have steadily performed research and development to commercialize the hybrid electric vehicle. In general, the electric vehicle, the hybrid vehicle, and the fuel cell vehicle are driven by a drive motor obtaining torque through electrical energy.

Particularly, the hybrid vehicle is a vehicle that uses two or more power sources, and an engine and a drive motor are used as the power sources of the hybrid vehicle. The hybrid vehicle uses an optimal operational range of the engine and the driving motor, and recovers energy during braking to to improve fuel efficiency and use energy efficiently. The vehicle having the drive motor operates the drive motor as a generator while driving by braking or inertia to recover braking or inertia energy, thereby charging the battery. In particular, the torque of the drive motor has a negative value and provides a braking force operated in a direction opposite to the driving direction of the vehicle.

Further, the vehicle having the drive motor may be required to down-shift while driving with the braking or inertia. While performing the down-shift, a speed (i.e., a speed of the drive motor) of the input shaft of the transmission is increased to a speed corresponding to a target shift state. In particular, according to the conventional shift control method, to improve the shift quality, an absolute value of the torque of the drive motor is adjusted using a torque intervention method, and engagement and disengagement of an off-going element and an on-coming element of the transmission is performed.

However, according to the conventional shift control method, while performing the down-shift, when the required braking amount of the driver is changed based on the operation of the brake pedal, a regenerative braking requirement amount is changed, and as a result, the torque of the drive motor (i.e., the torque of the input shaft of the transmission) is changed, and thus, it may be difficult to estimate the torque of the output shaft of the transmission. Accordingly, since it may be difficult to estimate a regenerative braking performance amount that corresponds to the torque of the output shaft of the transmission, it may be difficult to divide the braking amount that must be actually provided to the vehicle into the regenerative braking performance amount and a friction braking amount of the brake.

The above information disclosed in this section is merely for enhancement of understanding of the background of the invention and therefore it may contain information that does not form the prior art that is already known in this country to a person of ordinary skill in the art.

SUMMARY

The present invention provides a control method of the vehicle including the drive motor of which braking control and shift control are improved by increasing the torque of the drive motor to a predetermined value when the shifting condition is satisfied during the driving by the braking or the inertia, and an apparatus thereof.

A control method of a vehicle including a drive motor according to an exemplary embodiment of the present invention may include: determining whether a braking condition is satisfied based on a vehicle speed, a position of an accelerator pedal, and a position of a brake pedal; determining whether a shifting condition is satisfied when the braking condition is satisfied; operating an inverter to increase torque of the drive motor to be maintained as a predetermined value when the shifting condition is satisfied; operating a first hydraulic pressure actuator to begin release of an off-going element and to begin engagement of the on-coming element when the torque of the drive motor becomes the predetermined value; calculating a friction braking torque that corresponds to a sum of total braking torque corresponding to the total braking amount and a coast regeneration torque eliminated as the torque of the drive motor is maintained as the predetermined value, and operating a second hydraulic pressure actuator such that a wheel cylinder generates the friction braking torque; and operating the inverter when a speed of the drive motor is synchronized with a speed that corresponds to a target shift stage to decrease the torque of the drive motor to generate regenerative braking torque corresponding to a regenerative braking allowance.

In particular, the predetermined value may be about 0. When the torque of the drive motor is increased as the predetermined value and is maintained, an increase rate of the torque of the drive motor may be equal to or less than a threshold increase rate, and the threshold increase rate may be set in consideration of the performance of the transmission and responsiveness of the friction braking. In addition, when decreasing the torque of the drive motor to generate the regenerative braking torque corresponding to the regenerative braking allowance, a decrease rate of the torque of the drive motor may be equal to or greater than a threshold decrease rate, and the threshold decrease rate may be set in consideration of the performance of the transmission and responsiveness of the friction braking.

The coast regeneration torque may be calculated using a coast regeneration torque map in which the coast regeneration torque of the drive motor based on the vehicle speed is set. The total braking amount may be calculated based on the vehicle speed and the position of the brake pedal. The regenerative braking allowance may be calculated based on the total braking amount and a state of charge (SOC) of the battery. The regenerative braking allowance may be calculated by further considering a temperature of the battery.

The control method may include: calculating the regenerative braking performance amount based on the state of the drive motor and the state of the transmission when the shifting condition is not satisfied and when the braking condition is satisfied; and calculating the friction braking amount based on the total braking amount and the regenerative braking performance amount, and operating the second hydraulic pressure actuator to cause the wheel cylinder to generate the friction braking torque that corresponds to the friction braking amount.

A control apparatus of a vehicle including a drive motor according to an exemplary embodiment of the present invention may include: a data detector configured to detect data to operate the vehicle including the drive motor; a controller configured to determine whether a braking condition is satisfied based on the data, calculate a total braking amount and a regenerative braking allowance when the braking condition is satisfied, and determining whether a shifting condition is satisfied when the braking condition is satisfied; a first actuator configured to receive a control signal from the controller to adjust a hydraulic pressure supplied to each frictional element of the transmission; a second actuator configured to receive the control signal from the controller to adjust the hydraulic pressure supplied to the wheel cylinder; and an inverter configured to receive the control signal from the controller to determine a switching operation of a switching element, wherein the controller may be configured to operate the inverter when the shifting condition is satisfied to increase the torque of the drive motor as a predetermined value (e.g., about 0) to be maintained.

The controller may further be configured to calculate a friction braking torque that corresponds to a sum of the total braking torque corresponding to the total braking amount and a coast regeneration torque eliminated as the torque of the drive motor may be maintained as the predetermined value, and may be configured to operate the second hydraulic pressure actuator to cause the wheel cylinder to generate the friction braking torque. The controller may further be configured to calculate the coast regeneration torque using a coast regeneration torque map in which the coast regeneration torque of the drive motor based on the vehicle speed is set.

An increase rate of the torque of the drive motor may be equal to or less than a threshold increase rate, and the threshold increase rate may be set in consideration of the performance of the transmission and responsiveness of the friction braking. When a speed of the drive motor is synchronized with a speed that corresponds to a target shift stage, the controller may be configured to operate the inverter to decrease the torque of the drive motor to generate the regenerative braking torque that corresponds to the regenerative braking allowance.

A decrease rate of the torque of the drive motor may be equal to or greater than a threshold decrease rate, and the threshold decrease rate may be set in consideration of the performance of the transmission and responsiveness of the friction braking. The controller may be configured to calculate the total braking amount based on the vehicle speed and the position of the brake pedal. The controller may further be configured to calculate the regenerative braking allowance based on the total braking amount and a state of charge (SOC) of the battery. Additionally, the controller may be configured to calculate the regenerative braking allowance by further considering a temperature of the battery.

The controller may be configured to calculate the regenerative braking performance amount based on the state of the drive motor and the state of the transmission when the shifting condition is not satisfied and when the braking condition is satisfied, may be configured to calculate the friction braking amount based on the total braking amount and the regenerative braking performance amount, and may be configured to operate the second hydraulic pressure actuator to cause the wheel cylinder to generate the friction braking torque that corresponds to the friction braking amount.

As described above, according to an exemplary embodiment of the present invention, when the shifting condition is satisfied during driving by the braking or the inertia, the torque of the drive motor may be maintained as the predetermined value to maintain the torque (i.e., regenerative braking performance amount) of the output shaft of the transmission in the shift section. Accordingly, a more accurate shift control may be achieved and the shifting time may be reduced. Additionally, since the regenerative braking performance amount is not changed in the shift section, a more accurate braking control may be possible.

BRIEF DESCRIPTION OF THE DRAWINGS

A brief description of each drawing is provided to more sufficiently understand drawings used in the detailed description of the present invention.

DESCRIPTION OF SYMBOLS

Figure 1:
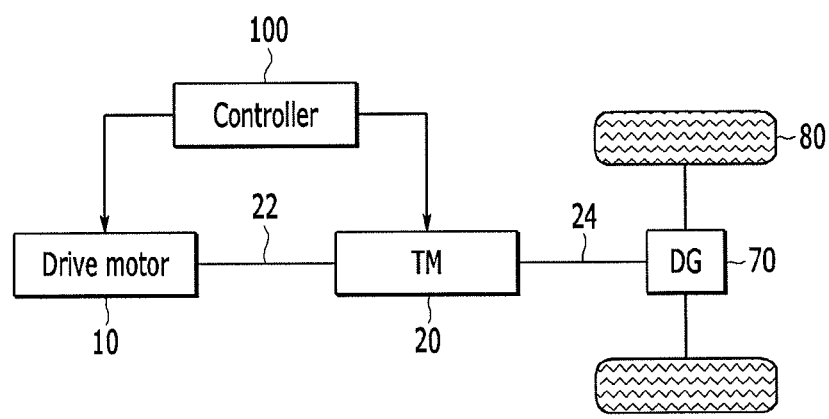
FIG. 1 is a view showing a vehicle applied with a control apparatus according to an exemplary embodiment of the present invention.

5: engine
10: drive motor
20: transmission
30: engine clutch
40: battery
50: inverter
60: HSG
70: differential gear device
80: wheel
90: data detector
100: controller
110: first hydraulic pressure actuator
120: second hydraulic pressure actuator
130: wheel cylinder

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The present invention will be described more fully hereinafter with reference to the accompanying drawings, in which exemplary embodiments of the invention are shown. As those skilled in the art would realize, the described exemplary embodiments may be modified in various different ways, all without departing from the spirit or scope of the present invention. For the purpose of clear description of an exemplary embodiment of the present invention, parts which are not related to the description are omitted. The same reference numbers are used throughout the specification to refer to the same or like parts. Further, since each component shown in the drawings is arbitrarily illustrated for easy description, the present invention is not particularly limited to the component illustrated in the drawings.

FIG. 1 is a view showing a vehicle applied with a control apparatus according to an exemplary embodiment of the present invention. As shown in FIG. 1, a vehicle applied with a control apparatus according to an exemplary embodiment of the present invention may include a drive motor 10, a transmission 20, a differential gear device 70, a wheel 80, and a controller 100. The drive motor 10 may be configured to generate power to drive the vehicle. In the power transmission of the vehicle according to an exemplary embodiment of the present invention, the power generated in the drive motor 10 may be transmitted to an input shaft 22 of the transmission 20, and the power output from an output shaft 24 of the transmission 20 may be transmitted to an axle via the differential gear device 70. The axle may be configured to rotate the wheel 80 to run the vehicle by the power generated from the drive motor 20.

Figure 2:
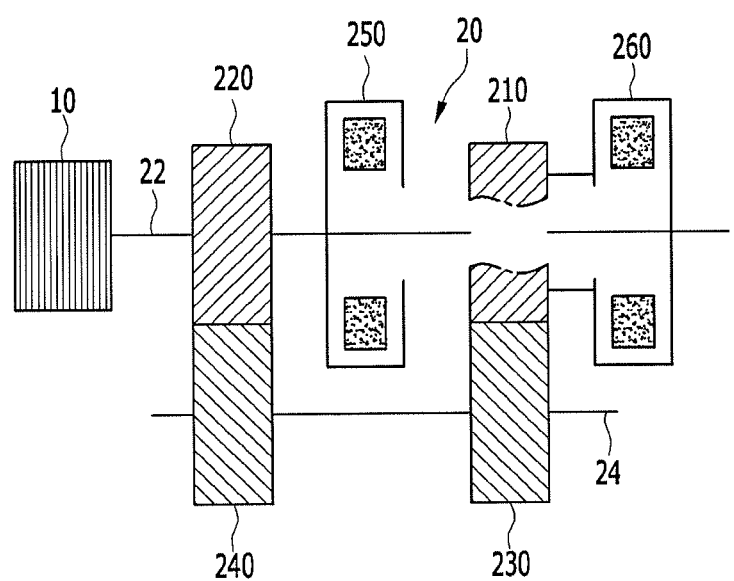
FIG. 2 is a schematic diagram of a transmission applied with a control apparatus according to an exemplary embodiment of the present invention.

FIG. 2 is a schematic diagram of a transmission applied with a control apparatus according to an exemplary embodiment of the present invention. As shown in FIG. 2, the transmission 20 applied with the control apparatus according to an exemplary embodiment of the present invention may be configured to receive the power from the input shaft 22 connected to the drive motor 10, and transmit the power to the output shaft 24. At least one planetary gear set may be interposed between the input shaft 22 and the output shaft 24 to change and transmit a speed of the input shaft 22 to the output shaft 24. In the transmission 20, at least one frictional element that selectively connects respective operational members of the planetary gear set with the input shaft 22, a transmission case (not shown), or another operational member is disposed. In the present specification, for better comprehension and ease of description, only first and second drive gears 210 and 220, first and second driven gears 230 and 240, and first and second frictional elements 250 and 260 are shown, but the invention is not limited thereto.

The first drive gear 210 may be disposed on the input shaft 22, and may be configured to execute a first shift stage by the operation of the first frictional element 250. The first drive gear 210 may be engaged with the first driven gear 230. The second drive gear 220 may be disposed on the input shaft 22, and may be configured to execute a second shift stage by the operation of the second frictional element 260. The second drive gear 220 may be engaged with the second driven gear 240. The shift from the first shift stage to the second shift stage may be executed by changing the first frictional element 250 as the off-going element from the engagement state to the release state and the second frictional element 260 as the on-coming element from the release state to the engagement state. The above-described transmission 20 is one example to which the spirit of the present invention may be applied, but the spirit of the present invention may be applied to various other transmissions in addition to the transmission 20.

Figure 3:
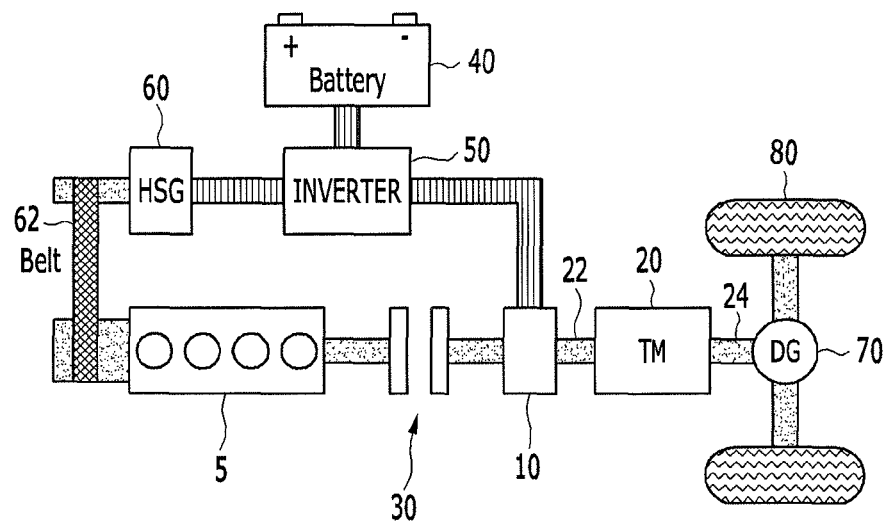
FIG. 3 is a view showing a hybrid vehicle applied with a control apparatus according to an exemplary embodiment of the present invention.

FIG. 3 is a view showing a hybrid vehicle applied with a control apparatus according to an exemplary embodiment of the present invention. As shown in FIG. 3, the hybrid vehicle applied with the control apparatus according to an exemplary embodiment of the present invention may include an engine 5, a drive motor 10, a transmission 20, an engine clutch 30 that selectively connects the engine 5 and the drive motor 10, a battery 40, an inverter 50, a hybrid starter & generator (HSG) 60, a differential gear device 70, a wheel 80, and a controller (100, referring to FIG. 1 and FIG. 4).

The hybrid electric vehicle may provide driving in an electric vehicle (EV) mode in which torque of the motor is used; a hybrid electric vehicle (HEV) mode in which torque of the engine is used as main torque and torque of the motor is used as auxiliary torque by engaging or releasing the engine clutch based on an acceleration and deceleration intention based on a manipulation of (e.g., engagement of) an accelerator pedal and a brake pedal by a driver, a vehicle speed, a state of charge (SOC) of the battery, and the like; and a regenerative braking mode in which braking and inertial energy are recovered through electrical power generation of the motor during braking of the vehicle or during driving of the vehicle by inertia to be charged in the battery.

The engine 5 may be configured to combust a fuel to generate torque, and various engines such as a gasoline engine, a diesel engine, and a liquid petroleum gas engine and electric motor (LPI) may be used as the engine 5. In connection with the power transmission of the hybrid vehicle, the power generated from the engine 5 and/or the drive motor 10 may be selectively transmitted to the input shaft 22 of the transmission 20, and the power output from the output shaft 24 of the transmission 20 may be transmitted to the axle via the differential gear device 70. The axle may be configured to rotate the wheel 80 to run the hybrid electric vehicle by the power generated from the engine 5 and/or the motor 10.

The battery 40 may be configured to supply electricity to the drive motor 10 using the inverter 50 in an electric vehicle (EV) mode and a hybrid electric vehicle (HEV) mode, and may be charged with electricity recovered by the inverter 50 in a regenerative braking mode. The HSG 60 may be configured to start the engine 5 or generate electricity by the output of the engine 5. The HSG may be referred to as an integrated starter & generator (ISG). The engine 5 and the HSG 60 may be connected via a belt 62. The controller 100 may be configured to distribute the torque of the engine 5 and the motor 10 based on the driving conditions of the hybrid vehicle, and execute conversion between the EV mode and the HEV mode.

Figure 4:
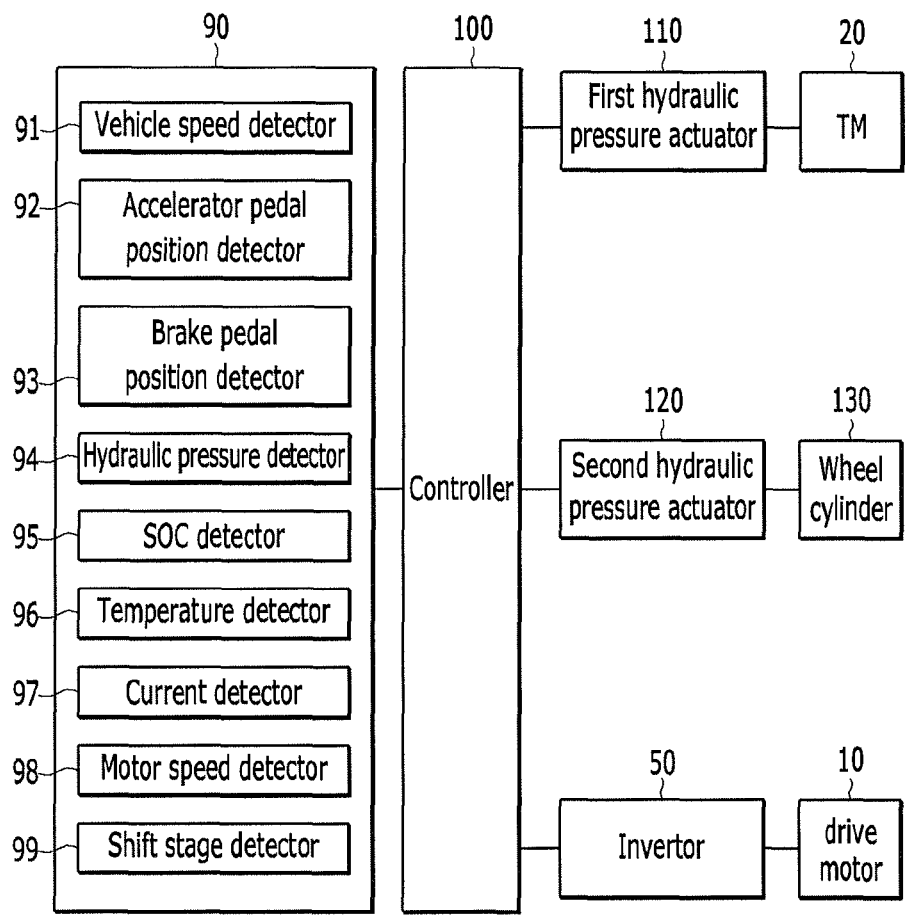
FIG. 4 is a block diagram of a control apparatus according to an exemplary embodiment of the present invention.

FIG. 4 is a block diagram of a control apparatus according to an exemplary embodiment of the present invention. As shown in FIG. 4, the control apparatus according to an exemplary embodiment of the present invention may include a data detector 90, a controller 100, a first hydraulic pressure actuator 110, a second hydraulic pressure actuator 120, and an inverter 50.

The data detector 90 may be configured to detect (e.g., collect or obtain) data to operate the vehicle including the drive motor 10, and the data detected by the data detector 90 may be transmitted to the controller 100. The data detector 90 may include a vehicle speed detector 91, an accelerator pedal position detector 92, a brake pedal position detector 93, a hydraulic pressure detector 94, an SOC detector 95, a temperature detector 96, a current detector 97, and a motor speed detector 98 (e.g., a plurality of sensors).

The vehicle speed detector 91 may be configured to detect or sense a vehicle speed and transmit a corresponding signal to the controller 100. The accelerator pedal position detector 92 may be configured to detect or sense a position (i.e., engagement degree of the accelerator pedal or the amount of pressure exerted onto the pedal) of an accelerator pedal and transmit a corresponding signal to the controller 100. When the accelerator pedal is completely engaged, the position of the accelerator pedal is 100%, and when the accelerator pedal is disengaged (e.g., no pressure is exerted onto pedal), the position of the accelerator pedal is 0%. The brake pedal position detector 93 may be configured to detect or sense a position of a brake pedal (i.e., an engagement degree of the brake pedal or the amount of pressure exerted onto the pedal) and transmit a corresponding signal to the controller 100. When the brake pedal is pushed engaged, the position of the brake pedal is 100%, and when the brake pedal is disengaged, the position of the brake pedal is 0%.

The hydraulic pressure detector 94 may be configured to detect or sense a hydraulic pressure supplied to each frictional element of the transmission 20 and transmit a corresponding signal to the controller 100. The SOC detector 95 may be configured to detect or sense an SOC of the battery 60 and transmit a corresponding signal to the controller 100. Instead of directly detecting the SOC of the battery 40, a current and a voltage of the battery 40 may be measured to estimate the SOC of the battery 40. The temperature detector 96 may be configured to detect or sense a temperature of the battery 40 and transmit a corresponding signal to the controller 100.

The current detector 97 may be configured to detect or sense a current flowing from the inverter 50 to the drive motor 10 and transmit a corresponding signal to the controller 100. The motor speed detector 98 may be configured to detect or sense the speed of the drive motor 10 and transmit a corresponding signal to the controller 100. A shift stage detector 99 may be configured to detect or sense a shift stage currently engaged and transmit a corresponding signal to the controller 100. The controller 100 may be implemented with one or more microprocessors executed by a predetermined program. The predetermined program may include a series of commands for performing each step included in a method for controlling the vehicle including the drive motor 10 according to an exemplary embodiment of the present invention to be described below.

The first hydraulic pressure actuator 110 may be configured receive the control signal from the controller 100 to adjust the hydraulic pressure supplied to each frictional element of the transmission 20. The first hydraulic pressure actuator 110 may include at least one control valve and at least one solenoid valve configured to adjust the hydraulic pressure applied to each frictional element. A second hydraulic pressure actuator 120 may be configured to receive the control signal from the controller 100 to adjust the hydraulic pressure supplied to a wheel cylinder 130. The second hydraulic pressure actuator 120 may include at least one control valve and at least one solenoid valve configured to adjust a hydraulic pressure supplied to the wheel cylinder 130.

The wheel cylinder 130 may be installed at the wheel 80 and may be operated based on the hydraulic pressure supplied from the second hydraulic pressure actuator 120 to provide the friction braking force to the vehicle. The inverter 50 may include a plurality of switching elements, and the current may be supplied from the inverter 50 to the drive motor 10 based on the switching operation of the switching element. The switching operation of the switching element of the inverter 50 may be determined based on the control signal of the controller 100.

Figure 5:
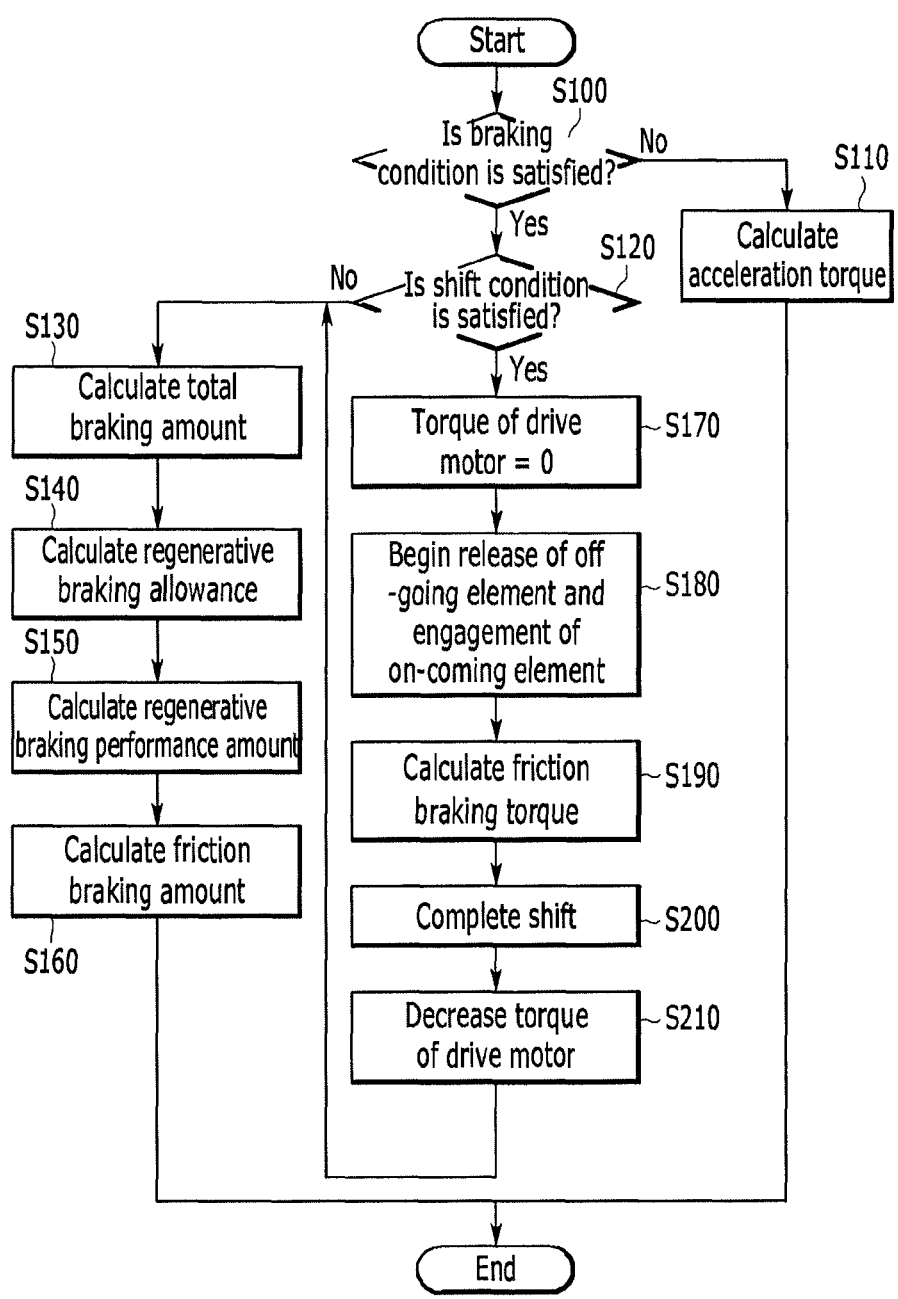
FIG. 5 is a flowchart of a control method of a vehicle including a drive motor according to an exemplary embodiment of the present invention.

Further, the control method of the vehicle including the drive motor according to an exemplary embodiment of the present invention will be described with reference to FIG. 5 to FIG. 7. FIG. 5 is a flowchart of a control method of a vehicle including a drive motor according to an exemplary embodiment of the present invention, FIG. 6 is a graph illustrating a control method of a vehicle including a drive motor according to an exemplary embodiment of the present invention, and FIG. 7 is a view of a coast regeneration torque map according to an exemplary embodiment of the present invention.

Figure 6:
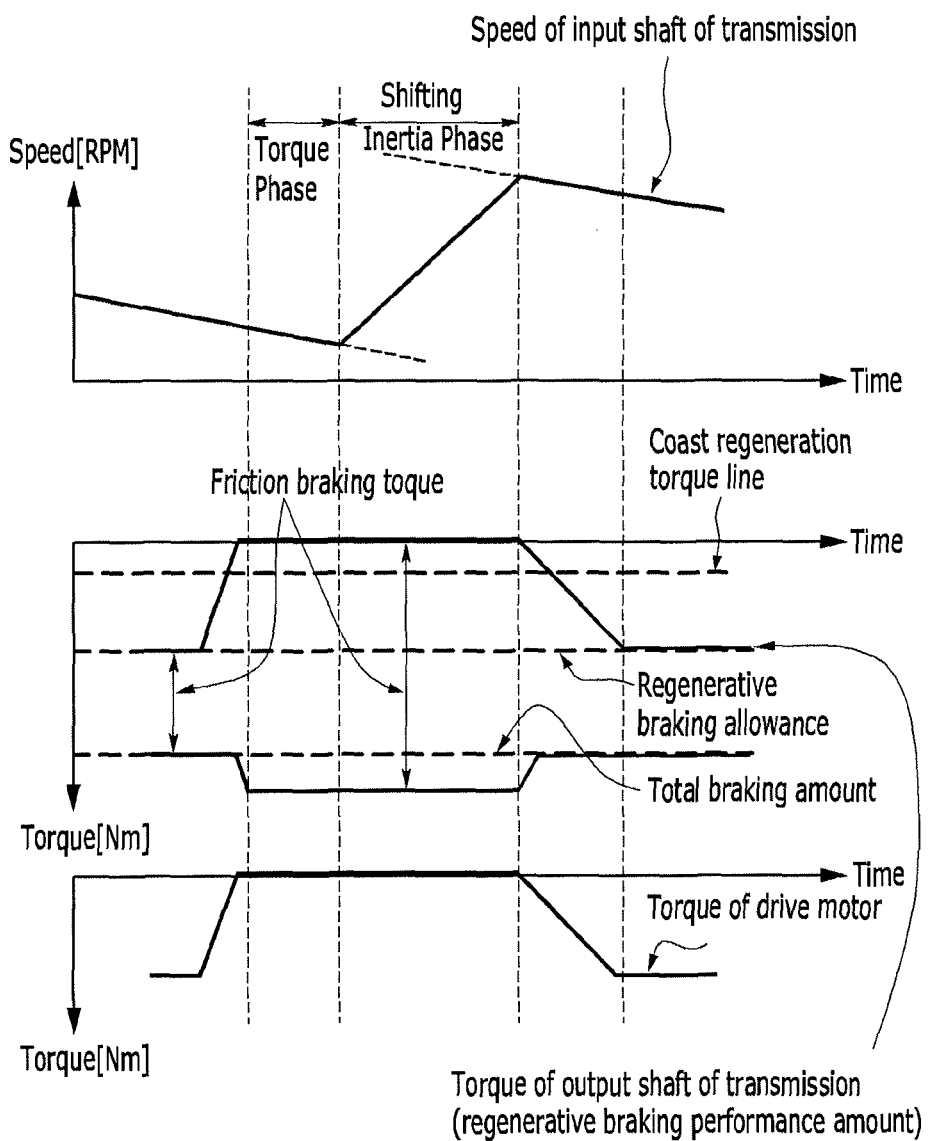
FIG. 6 is a graph illustrating a control method of a vehicle including a drive motor according to an exemplary embodiment of the present invention.
Figure 7:
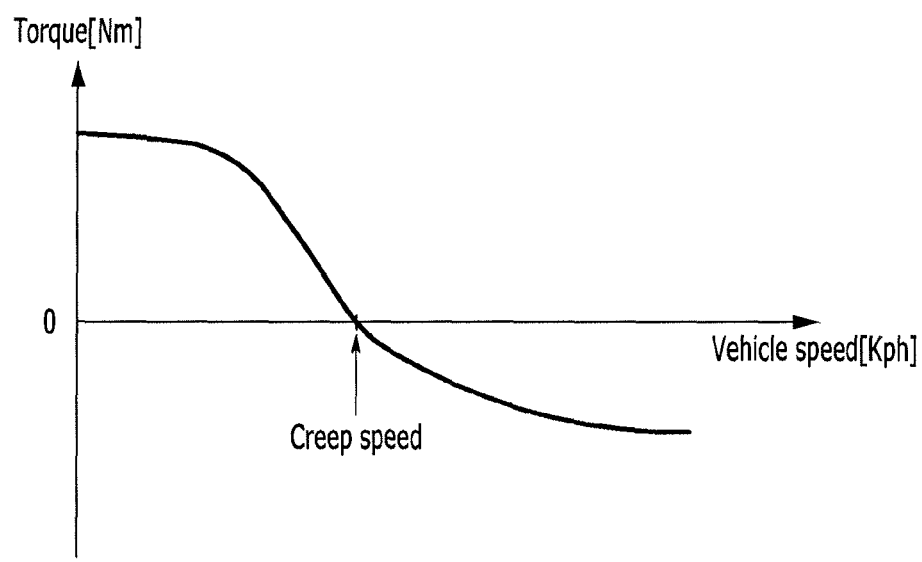
FIG. 7 is a view of a coast regeneration torque map according to an exemplary embodiment of the present invention.

Referring to FIG. 5 to FIG. 7, the control method of the vehicle including the drive motor 10 according to an exemplary embodiment of the present invention may begin by determining whether the braking condition is satisfied (S100). In other words, the controller 100 may be configured to determine whether the vehicle is driven by the braking or the inertia. The controller 100 may further be configured to determine whether the braking condition is satisfied based on the vehicle speed, the position of the accelerator pedal, and the position of the brake pedal. For example, when the position of the accelerator pedal is 0% and the position of the brake pedal is equal to or greater than 0% while the vehicle is being driven (e.g., the vehicle speed is greater than 0 mph), the braking condition may be satisfied.

When the braking condition is not satisfied in step S100, the controller 100 may be configured to calculate an acceleration torque based on the vehicle speed and the position the accelerator pedal (S110). The controller 100 may then be configured to operate the drive motor 10 to output the acceleration torque. Particularly, for the hybrid vehicle, the engine 5 and/or the drive motor 10 may be operated to output the acceleration torque.

The controller 100 may be configured to determine whether the shifting condition is satisfied when the braking condition is satisfied (S120). In other words, the controller 100 may be configured to determine whether the shifting (i.e., a down-shift) from the current shift stage to the target shift stage is required. The controller 100 may then be configured to determine whether the shifting condition is satisfied using a shift pattern map based on the vehicle speed and the position of the accelerator pedal. When the shifting condition is not satisfied in step S120, the controller 100 may be configured to calculate a total braking amount based on the vehicle speed and the position of the brake pedal (S130).

Meanwhile, as shown in FIG. 7, a coast regeneration torque map may be stored in the controller 100 (e.g., in a memory of the controller 100). In the coast regeneration torque map, a coast regeneration torque of the drive motor 10 based on the vehicle is set. For example, when the position of the accelerator pedal is 0%, the controller 100 may be configured to operate the inverter 50 to generate the coast regeneration torque by the drive motor 10 using the coast regeneration torque map. When the vehicle speed is less than a creep speed, the drive motor 10 may be configured to generate a positive torque and the battery 40 may be discharged. When the vehicle speed is greater than the creep speed, the drive motor 10 may be configured to generate a negative torque and the battery 40 may be charged.

When the coast regeneration torque is the negative value, the sum of the total braking torque that corresponds to the total braking amount and the coast regeneration torque becomes the braking torque acting on the vehicle. The controller 100 may be configured to calculate the regenerative braking allowance based on the total braking amount and the SOC of the battery 40 (S140). As the SOC of the battery 40 decreases, the regenerative braking allowance may increase. The controller 100 may be configured to operate the inverter 50 to cause the drive motor 10 to generate the regenerative braking torque that corresponds to the regenerative braking allowance.

Alternatively, the controller 100 may be configured to calculate the regenerative braking allowance by further considering the temperature of the battery 40. For example, when the temperature of the battery 40 is equal to or greater than an over-temperature threshold, the regenerative braking allowance may be 0. The controller 100 may be configured to calculate the regenerative braking performance amount based on the state of the drive motor 10 and the state of the transmission 20 (S150). For example, the controller 100 may be configured to calculate the regenerative braking performance amount that corresponds to the torque of the output shaft 24 of the transmission 20 based on the current flowing from the inverter 50 to the drive motor 10 and the shift stage that is currently engaged.

The controller 100 may be configured to calculate the friction braking amount based on the total braking amount and the regenerative braking performance amount (S160). The friction braking amount is a value of which the regenerative braking performance amount is subtracted from the total braking amount. The controller 100 may be configured to operate the second hydraulic pressure actuator 120 to cause the wheel cylinder 130 to generate the friction braking torque that corresponds to the friction braking amount.

Furthermore, in the step S120, when the shifting condition is satisfied, the controller 100 may be configured to operate the inverter 50 to increase the torque (i.e., the torque of the input shaft 22 of the transmission 20) of the drive motor 10 to a predetermined value (e.g., 0) to be maintained (S170). In particular, the increase rate of the torque of the drive motor 10 may be equal to or less than a threshold increase rate. The threshold increase rate may be set by considering the performance of the transmission 20 and the responsiveness of the friction braking. In other words, the threshold increase rate may be set as a ratio to prevent impact of the transmission 20.

When the torque of the drive motor 10 becomes the predetermined value, the controller 100 may be configured to operate the first hydraulic pressure actuator 110 such that the release of the off-going element begins and the engagement of the on-coming element begins (S180). In other words, a torque phase may begin. Particularly, the beginning of the release of the off-going element and the engagement of the on-coming element may indicate an adjustment beginning of the hydraulic pressure of each frictional element. The beginning of the release of the off-going element may indicate that the hydraulic pressure applied to the off-going element is decreased gradually or rapidly, and the beginning of the engagement of the on-coming element may indicate that the hydraulic pressure applied to the on-going element is increased gradually or rapidly.

While performing the release of the off-going element and the engagement of the on-coming element, the torque of the drive motor 10 may be maintained as 0 such that the torque (i.e., the regenerative braking performance amount) of the output shaft 24 of the transmission 20 is also maintained as 0. Accordingly, the controller 100 may not calculate the regenerative braking performance amount in a shift section, and the torque of the output shaft 24 of the transmission 20 may not be changed such that the more accurate shift control may be possible, thereby reducing the shifting time.

While the torque of the drive motor 10 is maintained as 0, since the coast regeneration torque and the regenerative braking performance amount are 0, the friction braking torque of the sum of the total braking torque that corresponds to the total braking amount and the eliminated coast regeneration torque may be required. The controller 100 may be configured to calculate the friction braking torque based on the total braking torque and the eliminated coast regeneration torque (S190). The controller 100 may be configured to operate the second hydraulic pressure actuator 120 to cause the wheel cylinder 130 to generate the friction braking torque that corresponds to the sum of the total braking torque and the eliminated coast regeneration torque.

While performing the release of the off-going element and the engagement of the on-coming element, an inertia phase in which the speed of the drive motor 10 is increased may begin. The controller 100 may be configured to complete the engagement of the on-coming element when the speed (i.e., the speed of the input shaft 22 of the transmission 20) of the drive motor 10 is synchronized with the speed that corresponds to the target shift stage. In other words, the hydraulic pressure supplied to the on-coming element may increase to the engagement hydraulic pressure to complete the shift (S200).

When the speed of the drive motor 10 is synchronized with the speed that corresponds to the target shift stage, the controller 100 may be configured to operate the inverter 50 to decrease the torque of the drive motor 10 to generate the regenerative braking torque that corresponds to the regenerative braking allowance (S210). In particular, the decrease rate of the torque of the drive motor 10 may be equal to or greater than a threshold decrease rate. The threshold decrease rate may be set by considering the performance of the transmission 20 and the responsiveness of the friction braking. The threshold decrease rate may be set as the ratio to prevent the impact of the transmission 20. Thereafter, the controller 100 may again perform the steps from S130.

As described above, according to an exemplary embodiment of the present invention, while driving by the braking or the inertia, when the shifting condition is satisfied, the torque of the drive motor 10 may be maintained as the predetermined value such that the torque of the output shaft of the transmission is maintained in the shift section. Accordingly, the more accurate shift control may be possible and the shifting time may be reduced. Additionally, in the shift section, since the regenerative braking performance amount is not changed, the more accurate braking control may be possible.

While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A method for controlling a vehicle including a drive motor, comprising:
    determining, by a controller, whether a braking condition is satisfied based on a vehicle speed, a position of an accelerator pedal, and a position of a brake pedal;
    determining, by the controller, whether a shifting condition is satisfied when the braking condition is satisfied;
    operating, by the controller, an inverter to increase torque of the drive motor to be maintained as a predetermined value when the shifting condition is satisfied;
    operating, by the controller, a first hydraulic pressure actuator to begin release of an off-going element and to begin engagement of the on-coming element when the torque of the drive motor becomes the predetermined value;
    calculating, by the controller, a friction braking torque that corresponds to a sum of a total braking torque corresponding to total braking amount and a coast regeneration torque eliminated as the torque of the drive motor is maintained as the predetermined value, and operating a second hydraulic pressure actuator to cause a wheel cylinder to generate the friction braking torque; and
    operating, by the controller, the inverter when a speed of the drive motor is synchronized with a speed that corresponds to a target shift stage to decrease the torque of the drive motor to generate regenerative braking torque that corresponds to a regenerative braking allowance.

2. The method of claim 1, wherein the predetermined value is 0.

3. The method of claim 1, wherein an increase rate of the torque of the drive motor is equal to or less than a threshold increase rate, and the threshold increase rate is set by considering performance of a transmission and responsiveness of a friction braking.

4. The method of claim 1, wherein a decrease rate of the torque of the drive motor is equal to or greater than a threshold decrease rate, and the threshold decrease rate is set by considering performance of a transmission and responsiveness of a friction braking.

5. The method of claim 1, wherein the coast regeneration torque is calculated using a coast regeneration torque map in which the coast regeneration torque of the drive motor based on the vehicle speed is set.

6. The method of claim 1, wherein the total braking amount is calculated based on the vehicle speed and a position of the brake pedal.

7. The method of claim 6, wherein the regenerative braking allowance is calculated based on the total braking amount and a state of charge (SOC) of a battery.

8. The method of claim 7, wherein the regenerative braking allowance is calculated by further considering a temperature of the battery.

9. The method of claim 1, further comprising:
    calculating, by the controller, a regenerative braking performance amount based on a state of the drive motor and a state of a transmission when the shifting condition is not satisfied when the braking condition is satisfied; and
    calculating, by the controller, a friction braking amount based on the total braking amount and the regenerative braking performance amount, and operating the second hydraulic pressure actuator to cause a wheel cylinder to generate the friction braking torque that corresponds to the friction braking amount.

10. A control apparatus for a vehicle including a drive motor, comprising:
    a data detector configured to detect data to operate the vehicle including the drive motor;
    a controller configured to determine whether a braking condition is satisfied based on the data, calculate a total braking amount and a regenerative braking allowance when the braking condition is satisfied, and determine whether a shifting condition is satisfied when the braking condition is satisfied;
    a first actuator configured to receive a control signal from the controller to adjust a hydraulic pressure supplied to each frictional element of a transmission;
    a second actuator configured to receive the control signal from the controller to adjust the hydraulic pressure supplied to a wheel cylinder; and
    an inverter configured to receive the control signal from the controller to determine a switching operation of a switching element, wherein the controller is configured to operate the inverter when the shifting condition is satisfied to increase the torque of the drive motor as a predetermined value to be maintained.

11. The control apparatus of claim 10, wherein the predetermined value is 0.

12. The control apparatus of claim 10, wherein the controller is configured to calculate a friction braking torque that corresponds to a sum of the total braking torque corresponding to the total braking amount and a coast regeneration torque eliminated as the torque of the drive motor is maintained as the predetermined value, and operate a second hydraulic pressure actuator to cause the wheel cylinder to generate the friction braking torque.

13. The control apparatus of claim 12, wherein the controller is configured to calculate the coast regeneration torque using a coast regeneration torque map in which the coast regeneration torque of the drive motor depending on a vehicle speed is set.

14. The control apparatus of claim 10, wherein an increase rate of the torque of the drive motor is equal to or less than a threshold increase rate, and the threshold increase rate is set by considering performance of the transmission and responsiveness of a friction braking.

15. The control apparatus of claim 10, wherein when a speed of the drive motor is synchronized with a speed that corresponds to a target shift stage, the controller is configured to operate the inverter to decrease the torque of the drive motor to generate a regenerative braking torque that corresponds to the regenerative braking allowance.

16. The control apparatus of claim 15, wherein a decrease rate of the torque of the drive motor is equal to or greater than a threshold decrease rate, and the threshold decrease rate is set by considering performance of the transmission and responsiveness of a friction braking.

17. The control apparatus of claim 10, wherein the controller is configured to calculate the total braking amount based on a vehicle speed and a position of the brake pedal.

18. The control apparatus of claim 17, wherein the controller is configured to calculate the regenerative braking allowance based on the total braking amount and a state of charge (SOC) of a battery.

19. The control apparatus of claim 18, wherein the controller is configured to calculate the regenerative braking allowance by further considering a temperature of the battery.

20. The control apparatus of claim 10, wherein the controller is configured to:
calculate a regenerative braking performance amount based on a state of the drive motor and a state of the transmission when the shifting condition is not satisfied and the braking condition is satisfied;
calculate a friction braking amount based on the total braking amount and the regenerative braking performance amount; and
operate a second hydraulic pressure actuator to cause the wheel cylinder to generate the friction braking torque that corresponds to the friction braking amount.

* * * * *